US011795904B2

(12) United States Patent
Jenne et al.

(10) Patent No.: US 11,795,904 B2
(45) Date of Patent: Oct. 24, 2023

(54) INFLATABLE PRESSURE ABSORPTION WAVE ACTUATED PUMP

(71) Applicant: Alliance for Sustainable Energy, LLC, Golden, CO (US)

(72) Inventors: Dale Scott Jenne, Arvada, CO (US); Yi-Hsiang Yu, Golden, CO (US)

(73) Assignee: Alliance for Sustainable Energy, LLC, Golden, CO (US)

( * ) Notice: Subject to any disclaimer, the term of this patent is extended or adjusted under 35 U.S.C. 154(b) by 595 days.

(21) Appl. No.: 16/914,982

(22) Filed: Jun. 29, 2020

(65) Prior Publication Data
US 2020/0408187 A1 Dec. 31, 2020

Related U.S. Application Data

(60) Provisional application No. 62/867,363, filed on Jun. 27, 2019.

(51) Int. Cl.
*F03B 13/18* (2006.01)
*F04B 17/00* (2006.01)
*F04B 45/053* (2006.01)
*F04B 43/06* (2006.01)
*F03B 13/14* (2006.01)

(52) U.S. Cl.
CPC .......... *F03B 13/188* (2013.01); *F03B 13/148* (2013.01); *F04B 17/00* (2013.01); *F04B 43/06* (2013.01); *F04B 45/053* (2013.01); *Y02E 10/30* (2013.01)

(58) Field of Classification Search
CPC ........ F04B 17/00; F04B 45/053; F04B 43/06; F05B 2280/4004; Y02E 10/30; F03B 13/148; F03B 13/188
See application file for complete search history.

(56) References Cited

U.S. PATENT DOCUMENTS

| | | | | | |
|---|---|---|---|---|---|
| 1,523,031 | A | * | 1/1925 | Mitchell, Jr. | F03B 13/262 405/76 |
| 2,871,790 | A | * | 2/1959 | Weills | F03B 13/187 440/9 |
| 4,776,772 | A | * | 10/1988 | Everett | F03B 13/148 60/502 |
| 2003/0226358 | A1 | * | 12/2003 | Gerber | F03B 13/1845 60/495 |
| 2007/0137195 | A1 | * | 6/2007 | Tayla | F03B 13/142 60/497 |
| 2009/0007557 | A1 | * | 1/2009 | Farley | F03B 13/148 60/398 |
| 2010/0308589 | A1 | * | 12/2010 | Rohrer | F03B 13/24 290/53 |
| 2013/0009401 | A1 | * | 1/2013 | Biteryakov | F03B 13/10 29/596 |
| 2013/0192218 | A1 | * | 8/2013 | Briffett | F03B 13/14 60/501 |
| 2015/0362124 | A1 | * | 12/2015 | Favy | F02C 6/16 206/0.6 |

* cited by examiner

*Primary Examiner* — Dominick L Plakkoottam
(74) *Attorney, Agent, or Firm* — Alexandra M. Hall

(57) ABSTRACT

Disclosed herein is a wave energy converter that uses a flexible and inflatable chamber to absorb wave energy and convert it to electrical energy through the varying hydrostatic and hydrodynamic pressure at or below the water surface.

16 Claims, 13 Drawing Sheets

INFLATABLE PRESSURE ABSORPTION WAVE ACTUATED PUMP

CROSS-REFERENCE TO RELATED APPLICATIONS

This application claims the benefit of U.S. Provisional Patent Application 62/867,363 filed on Jun. 27, 2019, the contents of which are incorporated by reference in their entirety.

CONTRACTUAL ORIGIN

The United States Government has rights in this invention under Contract No. DE-AC36-08GO28308 between the United States Department of Energy and Alliance for Sustainable Energy, LLC, the Manager and Operator of the National Renewable Energy Laboratory.

BACKGROUND

The motion of ocean waves is a supply of kinetic energy to be harvested. However, most wave energy conversion technologies are expensive with unproven reliability in the ocean. Some wave energy converters translate the kinetic energy from the waves into hydraulic flow or motion that can be used to drive hydraulic motors, generators, desalination systems, and/or several other applications. Most wave energy conversion technologies on the market today rely on rigid-body dynamics. The loads that these wave energy converters must withstand may be localized into either translational or rotational joints, equating to very expensive structures and large stress concentrations. The large surface areas required also create logistic and installation challenges. Being that the structures are not easily packed down, they must be fabricated in expensive shipyards and towed out to their final deployment location. Many rigid-body wave energy converters are too large to be manufactured in centralized land locations and shipped to the coast, adding unnecessary manufacturing costs. Inherent to all marine energy systems, the devices are exposed to harsh ocean conditions, and mechanical seals that transfer either translational or rotational power have become a significant source of failure, preventing the needed operational life needed by developers.

SUMMARY

An aspect of the present disclosure is a device including a first column having a first length, a first end, and a second end, a second column having a second length, a third end, and a fourth end connected to the first column such that the third end of the second column and the second end of the first column are in contact and the first column and the second column are approximately concentric, a chamber attached to the first end of the first column, a first diaphragm located between the first column and the second column such that the first diaphragm separates the first column and the second column, an inlet valve located along the second length of the second column, and an outlet valve located along the second length of the second column, wherein the chamber contains a first fluid, the second column contains a second fluid, and the first diaphragm separates the first fluid from the second fluid. In some embodiments, the first column extends into the chamber and contains an opening into the chamber. In some embodiments, the wave energy pump also includes a mooring device, wherein the mooring connection is located along the second length of the second column, and the mooring device attaches the device to the sea floor. In some embodiments, the inlet valve is a one-way valve that allows the second fluid to flow into the second column, and the outlet valve is a one-way valve that allows the second fluid to flow out of the second column. In some embodiments, the first diaphragm has a neutral position, the first diaphragm is displaced from the neutral position by the first fluid when the chamber is compressed, when the first diaphragm is returned to the neutral position when the second fluid flows out of the outlet valve. In some embodiments, the chamber is attached to the first column by a first clamp and a second clamp. In some embodiments, the first fluid comprises a mixture of water and air. In some embodiments, the second fluid comprises sea water. In some embodiments, the wave energy pump also includes a second diaphragm, wherein the first diaphragm and second diaphragm are operated in parallel. In some embodiments, the first diaphragm is an elastomer diaphragm. In some embodiments, the first diaphragm is a spring/roller diaphragm. In some embodiments, the first diaphragm is a rubber diaphragm. In some embodiments, the chamber comprises a flexible material.

An aspect of the present disclosure is a method including attaching a wave energy pump to a solid object, the wave energy pump includes a first column having a first length, a first end, and a second end, a second column having a second length, a third end, and a fourth end, a chamber attached to the first end of the first column, a diaphragm positioned between the second end of the first column and the third end of the second column, an inlet valve located along the second length, and an outlet valve located along the second length. The method also includes establishing a neutral state of the wave energy pump, wherein the diaphragm is at a neutral position, and a first fluid is contained within the chamber. The method also includes a second fluid is contained within the second column, and applying a force to the wave energy pump, wherein the applying of the force compresses the chamber, forcing the first fluid to contact the diaphragm, the diaphragm is displaced by the contacting of the first fluid, and the second fluid is pumped out of the second column through the outlet valve by the displacing of the diaphragm. In some embodiments, the method also includes releasing the force on the wave energy pump, wherein the releasing of the force releases the chamber, allowing the first fluid to enter the chamber, the diaphragm is returned to its neutral position, and the second fluid is pulled into the second column through the inlet valve by the returning of the diaphragm to its neutral position. In some embodiments, the chamber comprises a flexible material attached to the first column by a first clamp and a second clamp. In some embodiments, the diaphragm is a spring/roller diaphragm. In some embodiments, the diaphragm is a rubber diaphragm. In some embodiments, the diaphragm is an elastomer diaphragm.

BRIEF DESCRIPTION OF THE DRAWINGS

Exemplary embodiments are illustrated in referenced figures of the drawings. It is intended that the embodiments and figures disclosed herein are considered to be illustrative rather than limiting.

FIG. 3 illustrates a rubber bellow/diaphragm within a wave energy pump as described in some embodiments herein.

FIG. 4 illustrates a spring/roller bellow/diaphragm within a wave energy pump as described in some embodiments herein.

FIG. 5 illustrates an elastomer bellow/diaphragm within a wave energy pump as described in some embodiments herein.

REFERENCE NUMERALS

Figure 1:
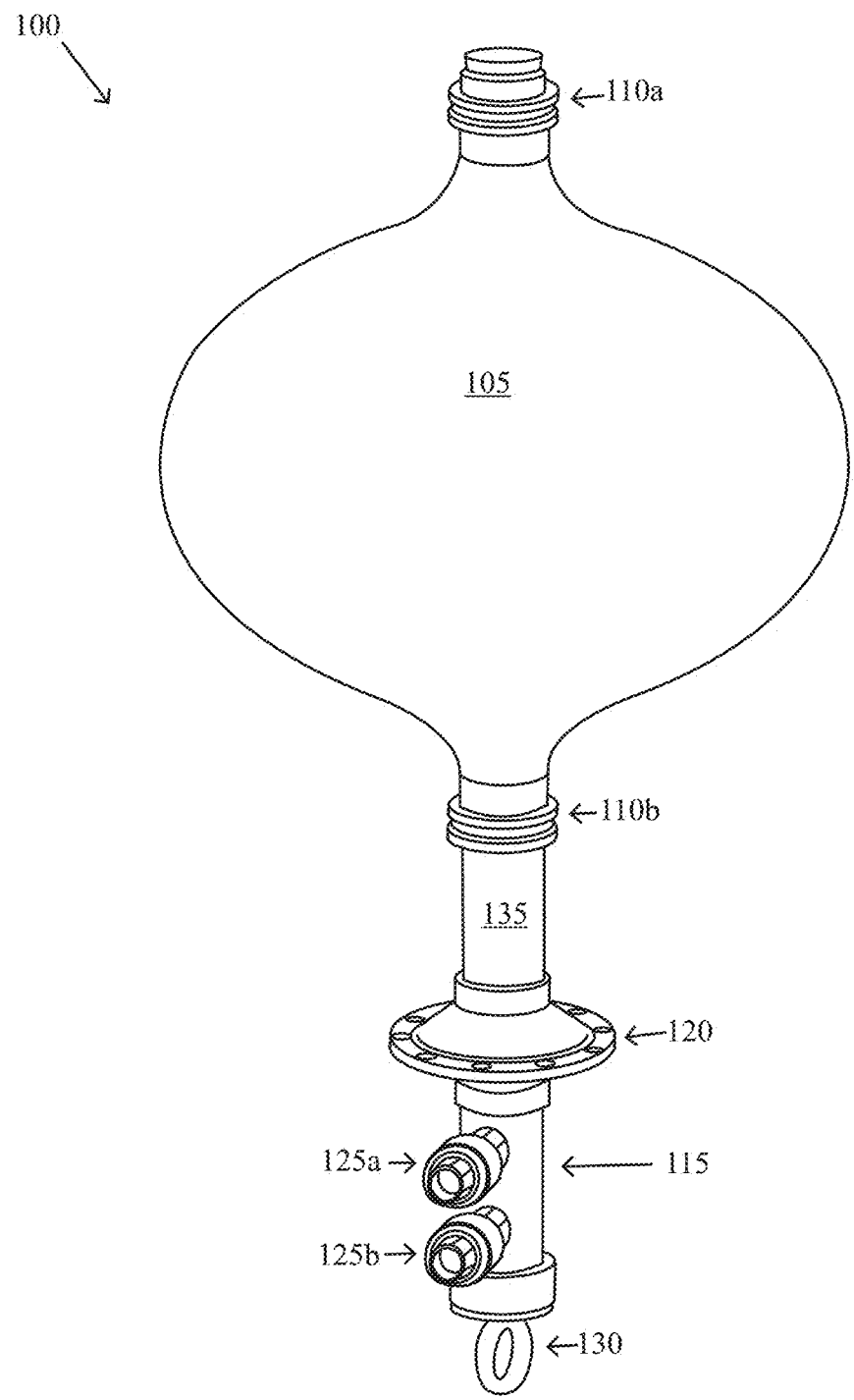
FIG. 1 illustrates a wave energy pump as described by some embodiments herein.

100 . . . wave energy pump
105 . . . deformable chamber
110 . . . clamp
115 . . . lower column
120 . . . diaphragm housing
125 . . . inlet/outlet valve
130 . . . mooring connection
135 . . . upper column
205 . . . opening
210 . . . liquid
215 . . . gas
305 . . . rubber diaphragm
310 . . . protective component
315 . . . screw
405 . . . spring
410 . . . bellow
415 . . . spring mount
505 . . . elastomer diaphragm
705 . . . line showing a damping coefficient of 20 Ns/m
710 . . . line showing a damping coefficient of 40 Ns/m
715 . . . line showing a damping coefficient of 60 Ns/m
720 . . . line showing a damping coefficient of 80 Ns/m
725 . . . line showing a damping coefficient of 100 Ns/m
805 . . . line showing a damping coefficient of 400 Ns/m
810 . . . line showing a damping coefficient of 600 Ns/m
815 . . . line showing a damping coefficient of 800 Ns/m
820 . . . line showing a damping coefficient of 1000 Ns/m
825 . . . line showing a damping coefficient of 1200 Ns/m
905 . . . line showing a damping coefficient of 1,000 Ns/m
910 . . . line showing a damping coefficient of 1,500 Ns/m
915 . . . line showing a damping coefficient of 2,000 Ns/m
920 . . . line showing a damping coefficient of 2,500 Ns/m
925 . . . line showing a damping coefficient of 3,000 Ns/m
1005 . . . line showing a damping coefficient of 20 Ns/m
1010 . . . line showing a damping coefficient of 40 Ns/m
1015 . . . line showing a damping coefficient of 60 Ns/m
1020 . . . line showing a damping coefficient of 80 Ns/m
1025 . . . line showing a damping coefficient of 100 Ns/m
1105 . . . line showing a damping coefficient of 400 Ns/m
1110 . . . line showing a damping coefficient of 600 Ns/m
1115 . . . line showing a damping coefficient of 800 Ns/m
1120 . . . line showing a damping coefficient of 1,000 Ns/m
1125 . . . line showing a damping coefficient of 1,200 Ns/m
1205 . . . line showing a damping coefficient of 1,000 Ns/m
1210 . . . line showing a damping coefficient of 1,500 Ns/m
1215 . . . line showing a damping coefficient of 2,000 Ns/m
1220 . . . line showing a damping coefficient of 2,500 Ns/m
1225 . . . line showing a damping coefficient of 3,000 Ns/m

DETAILED DESCRIPTION OF SOME EMBODIMENTS

The present disclosure describes a wave energy conversion system that is made of flexible materials to absorb wave energy through the varying hydrostatic and hydrodynamic pressure at or below the water surface and convert that kinetic energy into hydraulic flow. The wave energy converter of the present disclosure includes a deformable wave pump which may be used to create hydraulic flow.

FIG. 1 illustrates a wave energy pump 100 as described by some embodiments herein. The wave energy pump 100 comprises a pair of clamps 110a and 110b attaching a deformable chamber 105 to an upper column 135 A diaphragm housing 120 and an inlet valve 125a and an outlet valve 125b are attached to the lower column 115. A mooring connection 130 is attached to the end of the lower column 115. The deformable chamber 105 is a flexible material which contains a liquid and/or gas and can change its shape as it is subjected to forces from waves.

When the deformable chamber 105 is not compressed by the waves, the diaphragm (not shown in FIG. 1) contained in the diaphragm housing 120 is at an approximately neutral position. When the deformable chamber 105 is compressed by the waves (i.e., a force is exerted on the deformable chamber 105), the diaphragm (not shown in FIG. 1) inside the diaphragm housing 120 is extended, pushing water out of the outlet valve 125b. When the compression is released (i.e., the force on the deformable chamber 105 is released), the diaphragm returns to a neutral position and water flows in through the inlet valve 125a. In some embodiments this release of the force on the deformable chamber 105 may create a suction force through the inlet valve 125a. The displacement/movement of the diaphragm creates a fluid flow into and out of the lower column 115 by creating a pumping force when the diaphragm is displaced by the compression of chamber 105 and a suction when the diaphragm returns to its neutral position when the compression of chamber 105 is released. In some embodiments, the deformable chamber 105 may contain a mixture of both water and air, only water, or only air.

In some embodiments, the wave energy pump 100 may operate as a constant volume system that transfers energy, in the form of air or liquid pressure, into a diaphragm type positive displacement pump (i.e., a spring and/or diaphragm enclosed in the diaphragm housing 120). As a wave passes over the wave energy pump 100 it compresses the deformable chamber 105, which expands the spring and/or diaphragm (not shown in FIG. 1). A liquid (such as sea water, raw water, or a fuel) may flow into the lower chamber 115 through inlet valve 125a and out of the lower chamber 115 through outlet valve 125b. As the pressure applied to the deformable chamber 105 is reduced, diaphragm pulls liquid back into the lower column 115 through the inlet valve 125a and the cycle continues.

In some embodiments, the liquid exiting the outlet valve 125b may drive a piston, bellow, turbine, and/or generator. The wave energy converter 100 may be tailored to different applications (e.g., utility power, desalination, isolated blue economy markets, etc.) and utilized at different water depths. For example, the wave energy converter 100 may be transported and installed in deep water and/or shallow water locations. The mixture of air and/or water in the deformable chamber 105 may be adjusted based on the depth of the water in the location where the inflatable wave energy pump 100 is to be operated, or to optimize the buoyancy force of the wave energy pump 100.

In some embodiments, the diaphragm housing 120 separates the upper column 135 from the lower column 115. The diaphragm housing 120 may contain an elastomer bellow, a spring bellow, a roller bellow, and/or a piston with a spring. The responsiveness of the diaphragm contained within the diaphragm housing 120 may be controlled by resistive damping, to provide the necessary force feedback for energy capture. In some embodiments, the pumping power generated by the wave energy pump 100 may be maximized by utilizing a diaphragm in the diaphragm housing 120 which possesses a sufficient restoring force to push back against the external forces acting on the deformable chamber 105. To clarify, when the deformable chamber 105 is compressed, the diaphragm may be displaced, pushing a liquid out of the outlet valve 125b; when the compression on the deformable chamber is released, the diaphragm may return back to a neutral position, pulling a liquid into inlet valve 125a.

In some embodiments, the wave energy pump 100 may utilize flexible rubber coated fabrics commonly used by marine grade rigid inflatable boat (RIB) manufacturers as material for the deformable chamber 105. In other embodiments, the deformable chamber 105 may be made with rubber, rubber-coated fabrics, latex, polyvinyl chloride (PVC), polyurethane (PU), silicone elastomers, and/or fluoropolymers or other similar water-proof coatings and/or materials. In some embodiments, the wave energy pump 100 has an elastomeric diaphragm pump that does not contain mechanical or dynamic seals. In some embodiments, the wave energy pump 100 has a spring pump that provides the same resistive force and volumetric displacement as an elastomeric diaphragm pump. In some embodiments, the wave energy pump 100 utilizes varying pressure input (i.e., waves) to drive an elastomer diaphragm pump and create the needed restoring force to complete the cycle.

In some embodiments, the mooring connection 130 may attach the wave energy converter 100 to a base, such as the ocean floor, a dock, another wave energy device, or a submerged structure. In some embodiments, the mooring connection 130 may interlock with a connection on the base. In some embodiments, the mooring connection 130 may be a ring, or other connection point for a mooring line to be tied or attached to a submerged structure which is attached to the ocean floor. In some embodiments, the mooring connection 130 may not attach the inflatable wave energy converter 100 to the ocean floor but hold it at a certain level beneath the water's surface. The mooring connection 130 need not be at the end of the lower column 115, in some embodiments the mooring connection 130 may be at any point along the lower column 115 beneath the inflatable chamber 105. In some embodiments, additional mooring connections 130 could be added up the lower column 115 or the upper column 135. Additional mooring connections 130 may be included in wave energy pump 100 to provide additional stability based on the size of the wave energy pump 100 or the wave conditions at its location of installation.

In some embodiments, a pressure relief valve (not shown) may be included in the wave energy pump 100. The pressure relief valve (not shown) may be attached to the deformable chamber 105 or the upper column 135. The deformable chamber 105 enables load shedding technologies such as pressure relief valves (i.e., outlet valve 125b) which may be used during extreme wave conditions, reducing the required design loads, and/or utilizing nontraditional structural assemblies. In some embodiments, multiple outlet valves (such as 125b) may be on the lower column 115 in the wave energy pump.

Figure 2:
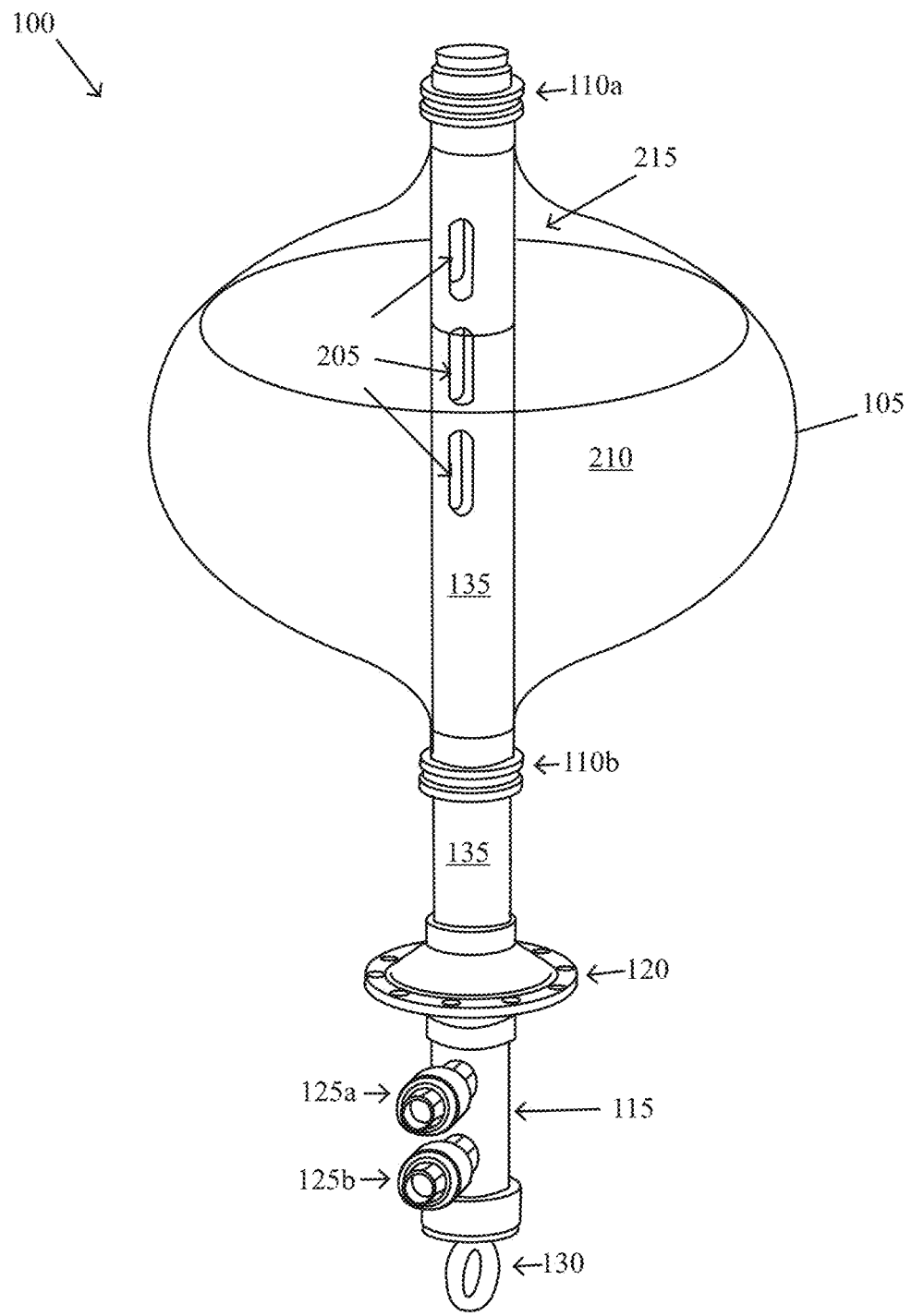
FIG. 2 illustrates an isometric transparent view of a wave energy pump as described by some embodiments herein.

FIG. 2 illustrates an isometric transparent view of a wave energy pump 100 as described by some embodiments herein. The wave energy pump 100 includes a pair of clamps 110a and 110b attaching a deformable chamber 105 to a upper column 135; an inlet valve 125a and an outlet valve 125b are attached to the lower column 115; and a mooring connection 130 attached to the end of the lower column 115. A diaphragm housing 120 separates the lower column 115 from the upper column 135. The wave energy pump 100 shows how the deformable chamber 105 may contain a liquid 210. In some embodiments the liquid 210 may be a fluid such as water (sea water or raw water) or a gas such as air or nitrogen. The liquid 210 may partially or entirely fill the deformable chamber 105. The remaining space in the deformable chamber 105 may be filled with a gas 215 such as air, nitrogen, helium, or another inert gas. To clarify, in some embodiments, the deformable chamber 105 may contain only a gas 215 and not a liquid 210, or that gas 215 and liquid 210 may be the same substance.

In some embodiments, an upper column 135 extends into the deformable chamber 105. The upper column 135 may include openings 205. The openings 205 may vary in number, shape, and size. As the deformable chamber 105 is compressed by wave forces, the liquid 210 in the deformable chamber 105 may flow through the openings 205 into the upper column 135 to displace the diaphragm (not shown in FIG. 2) contained in the diaphragm housing 120, which forces liquid out the outlet valve 125b.

In some embodiments, the inlet valve 125a and outlet valve 125b may one-way valves. That is, the inlet valve 125a may only allow liquid to flow into the lower column 115 and the outlet valve 125b may only allow liquid to flow out of the lower column 115. In some embodiments, the lower column 115 may contain more than one set of inlet valves and outlet valves. In some embodiments, there may be more outlet valves than inlet valves, or vice versa.

Figure 3A:
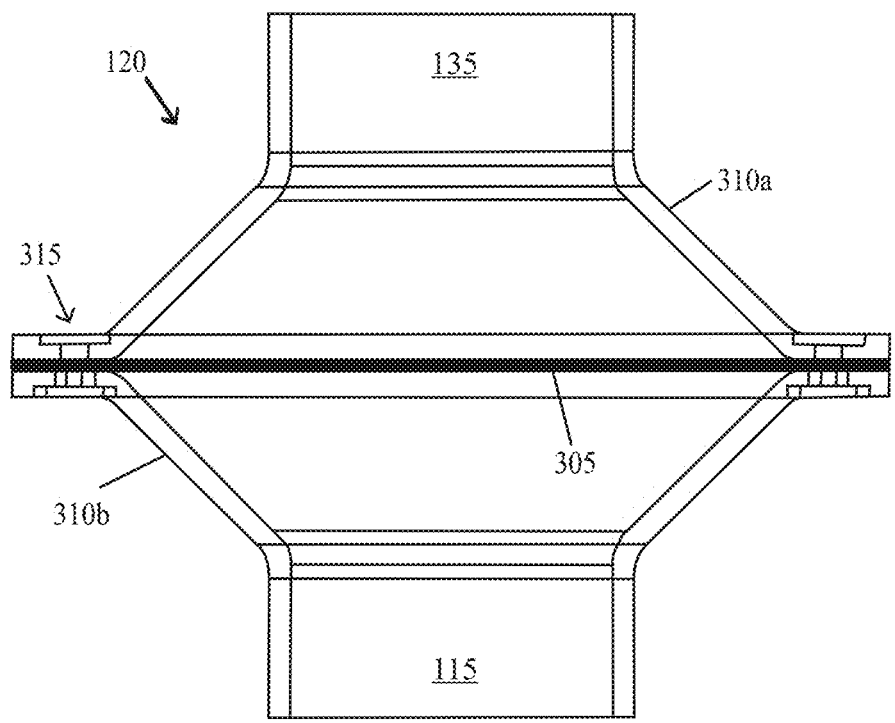
FIG. 3A shows the rubber diaphragm at rest and FIG. 3B shows the rubber diaphragm in a stretched state.
Figure 3B:
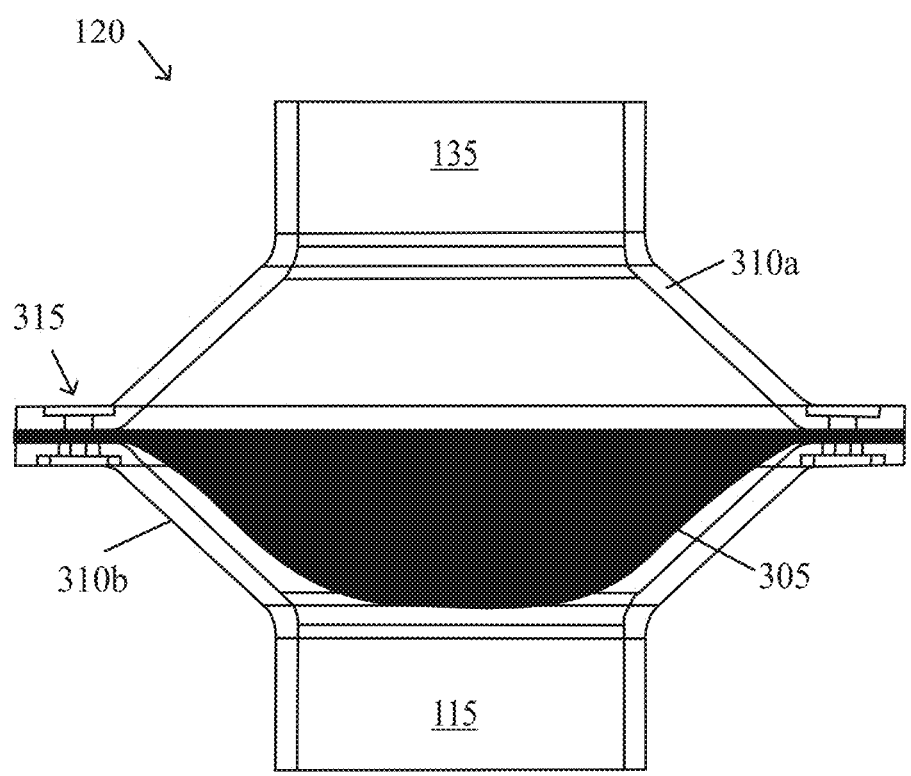

FIG. 3 illustrates a rubber diaphragm 305 contained within the diaphragm housing 120 of a wave energy converter 100 as described in some embodiments herein; FIG. 3A shows a rubber diaphragm 305 within the diaphragm housing 120 at rest and FIG. 3B shows the rubber diaphragm 305 in a stretched state (i.e., when the deformable chamber 105 is compressed). The rubber diaphragm 305 is contained within the diaphragm housing 120 in inflatable wave energy converter 100, which is positioned between the lower column 115 and the upper column 135. The rubber diaphragm 305 may be a thin flexible rubber, elastomer, or polymer material such as natural or artificial rubber. In some embodiments, the rubber diaphragm 305 may be approximately circular or elliptically shaped. The rubber diaphragm 305 may be held in place using screws 315, or another method of clamping/connecting the protective components 310a and 310b of the diaphragm housing 120 together, creating protection from the water. In some embodiments, the protective components 310a and 310b may be used to create the fluid-tight seal.

The rubber diaphragm 305 also provides a restoring force for the liquid 210 (shown in FIG. 2), which creates the pump action in the lower column 115. That is, as the deformable chamber 105 is compressed as a result of a force from the waves, the liquid 210 pushes on the rubber diaphragm 305, which pushes the fluid in the lower column 115 through outlet valve 125b. The rubber diaphragm 305 may be a rubber (or other flexible material) disk. In some embodiments, the rubber disk may be substantially made with an elastomer material. The rubber diaphragm 305 may separate the liquid 210 from the fluid contained in the lower column 115.

Figure 4A:
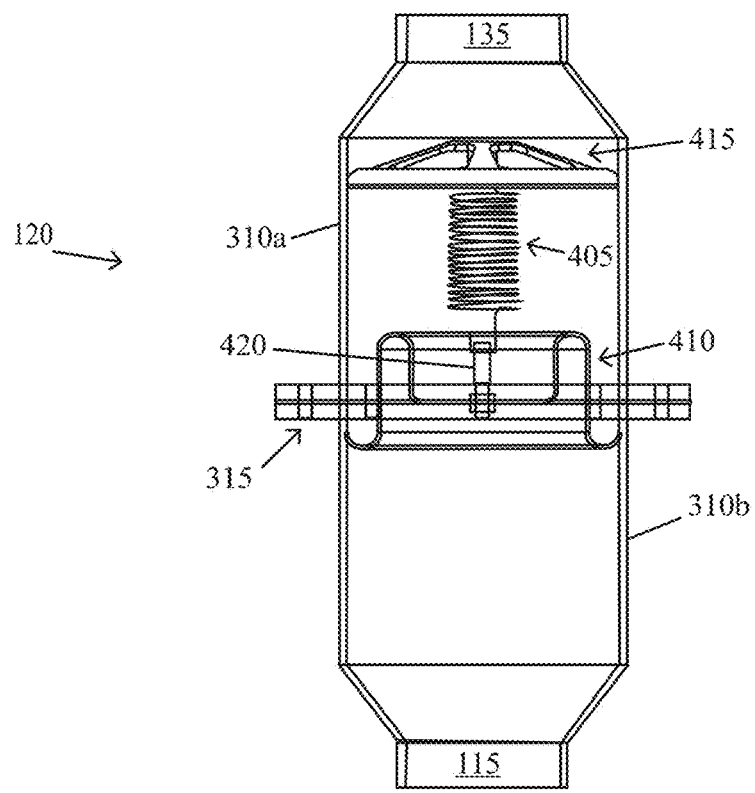
FIG. 4A shows the roller diaphragm at rest and FIG. 4B shows the roller diaphragm in a stretched state.
Figure 4B:
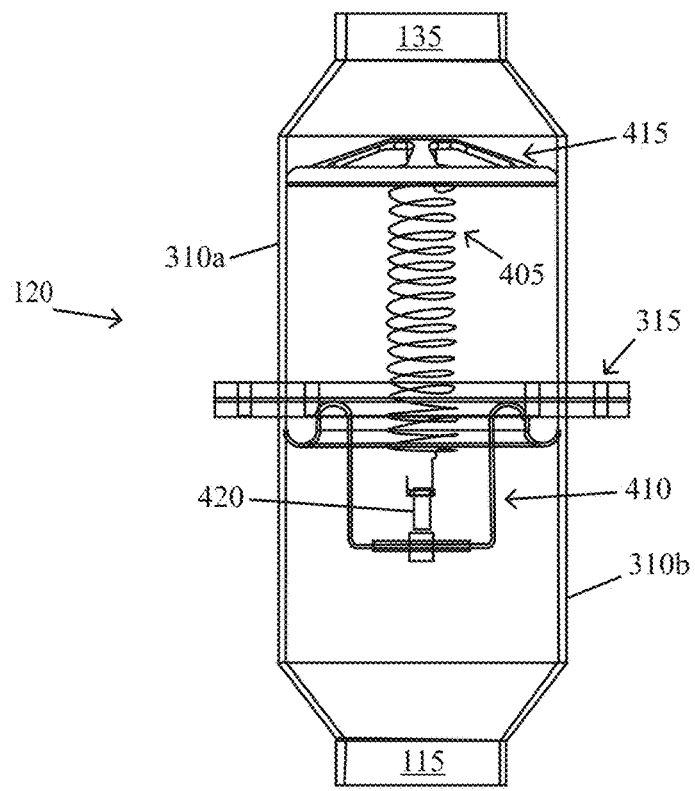

FIG. 4 illustrates a spring/roller bellow/diaphragm contained within a wave energy converter 100 as described in some embodiments herein; FIG. 4A shows the spring 405 at rest and FIG. 4B shows the spring 405 in a stretched state (i.e., when the deformable chamber 105 is compressed). The spring/roller bellow/diagram is contained within the diaphragm housing 120. A spring mount 415 may be oriented towards the inflatable chamber 105 and may be in contact with liquid 210. A bellow 410 may be oriented opposite of the spring mount 415. A spring 405 may be connected to the bellow 410 by pin 420. The spring mount 415 is an arbitrarily shaped rigid mount with slots to allow liquid 210 to pass through to the bellow 410. The purpose of the spring mount 415 is to provide a location to attach the spring 405. In some embodiments, the spring mount 415 may not be present in the wave energy pump 100. A flange (not shown) may extend from the diaphragm housing 120 to provide a fluid-tight seal between the top and bottom chambers. As shown in FIG. 4, the spring 405 is on the "inside" of the pump (meaning it is oriented towards the inflatable chamber and only contacts fluid 210 or gas 215) and other side of the bellow contacts liquid contained in the lower column 115. This embodiment allows for greater tunability by replacing the spring and corrosion resistance. In this embodiment the spring force is determined only by the spring 405, with negligible resistance from the bellow 410. This allows the same bellow to be used with multiple spring stiffnesses. Locating the spring on the top side of the bellow 410, eliminates contact with seawater if a gas or clean water are used to fill the upper chamber. Given the corrosive traits of seawater this embodiment allows for greater system reliability.

Figure 5A:
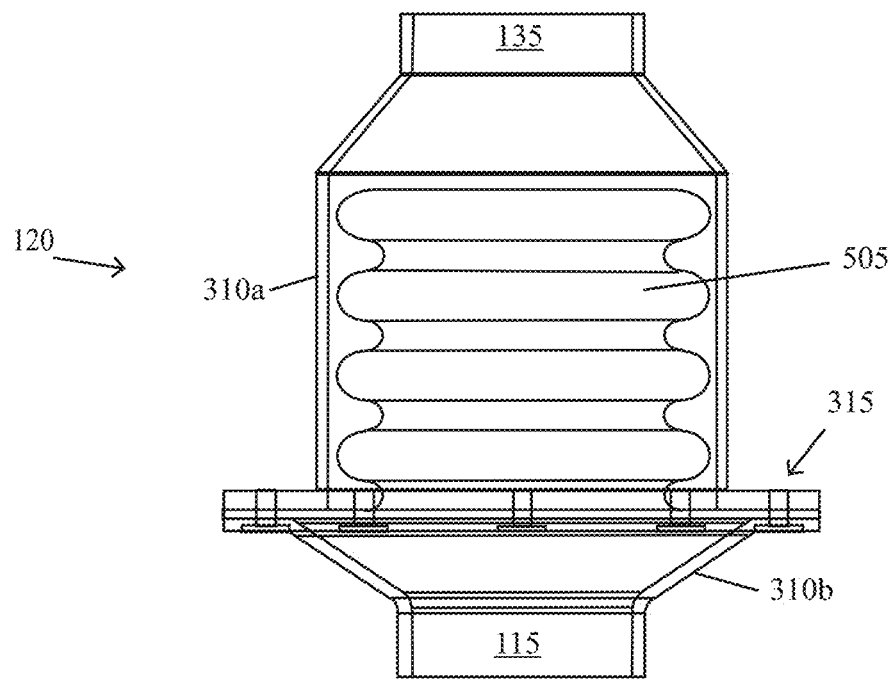
FIG. 5A shows the elastomer diaphragm at rest and FIG. 5B shows the elastomer diaphragm in a compressed state.
Figure 5B:
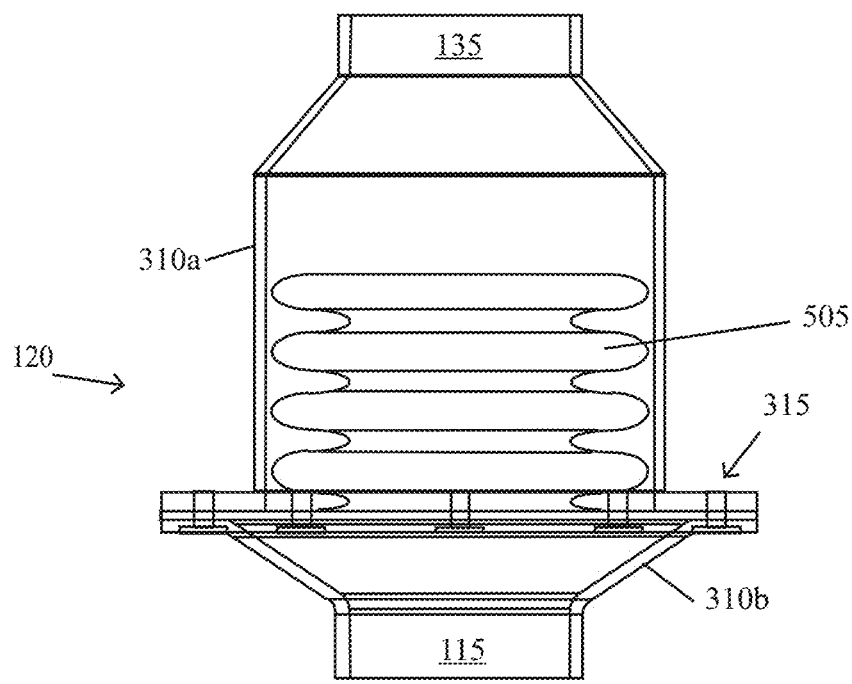

FIG. 5 illustrates an elastomer bellow/diaphragm contained within a wave energy converter 100 as described in some embodiments herein; FIG. 5A shows the elastomer diaphragm 505 at rest and FIG. 5B shows the elastomer diaphragm 505 in a compressed state (i.e., when deformable chamber 105 is compressed). The elastomer diaphragm 505 is contained within the diaphragm housing 120. The elastomer diaphragm 505 is generally at rest (or "relaxed") as shown in FIG. 5A. However, when the deformable chamber 105 is compressed or pressurized, the liquid 210 pushes down on the elastomer diaphragm 505, pushing the elastomer diaphragm 505 into a compressed state, as shown in FIG. 5B.

As shown in FIGS. 5A and 5B, the elastomer diaphragm 505 may create spring stiffness through a combination of the material properties of the elastomer diaphragm 505 and the geometry of the diaphragm housing 120. An embodiment of the wave energy converter 100 having a elastomer diaphragm 505 may have fewer components than an embodiment of the wave energy converter 100 containing the roller bellow shown in FIGS. 4A and 4B, while also being able to match the desired properties of the flat disk embodiment shown in FIGS. 3A and 3B. In some embodiments, the spring stiffness created by the elastomer diaphragm 505 may be low enough to react with anticipated hydrodynamic pressures and the elongation may be a function of the material properties of the elastomer. The elastomer diaphragm 505 may comprise a flexible material in an accordion-like shape, such that it is capable of being folded when compressed and unfolded when being released/stretched.

As shown in FIGS. 5A and 5B, an elastomer diaphragm 505 may be utilized to provide a restoring force. The elastomer (for example, rubber) can "roll" up and down as the pressure fluctuates. This may result in negligible spring stiffness form the elastomer itself and therefore in some embodiments may require a spring (not shown in FIG. 5A or 5B) to create the restoring stiffness.

Figure 6:
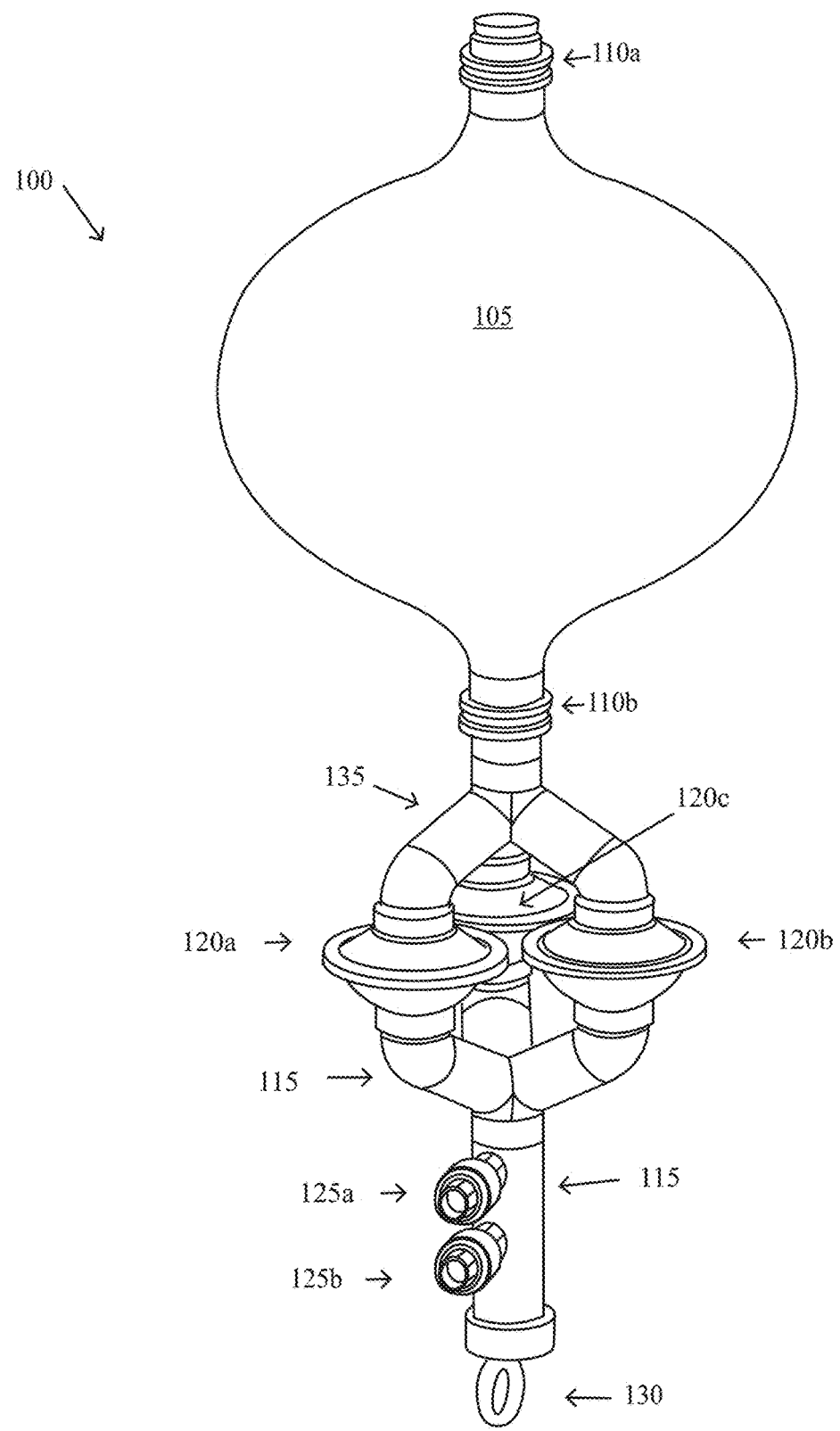
FIG. 6 illustrates a wave energy pump having multiple bellows/diaphragms as described in some embodiments herein.

FIG. 6 illustrates a wave energy pump having multiple bellows/diaphragms as described in some embodiments herein. In this embodiment, the wave energy converter 100 includes a pair of clamps 110a and 110b attaching an inflatable chamber 105 to a upper column 135; a pair of check valves, inlet valve 125a and outlet valve 125b are attached to the lower column 115; and a mooring connection 130 attached to the end of the lower column 115. The inflatable wave energy converter 100 has multiple diaphragm housings 120a, 120b, and 120c. Having multiple diaphragm housings 120a, 120b, and 120c allows for the use of multiple diaphragms/bellows. In some embodiments, bellows/diaphragms of more than one type may be used in the same wave energy pump 100. As with the embodiment shown in FIGS. 1 and 2, the inlet valve 125a allows water to flow into the lower column 115. External wave forces (e.g., current, pressure, and/or motion, etc.) may cause the deformable chamber 105 to be compressed and to force water into the upper column 135, resulting in a displacement in the diaphragms contained in the diaphragm housings 120a, 120b, and 120c.

In some embodiments, the multiple diaphragms in diaphragm housings 120a, 120b, and 120c may be tuned to different spring stiffnesses or damping. This could allow the wave energy converter 100 to respond to a variety of external wave forces. In some embodiments, control valves (not shown) could be placed along the lower column 115 to limit water flow to only certain diaphragms, based on the external conditions or the needs of the wave energy pump.

Figure 7:
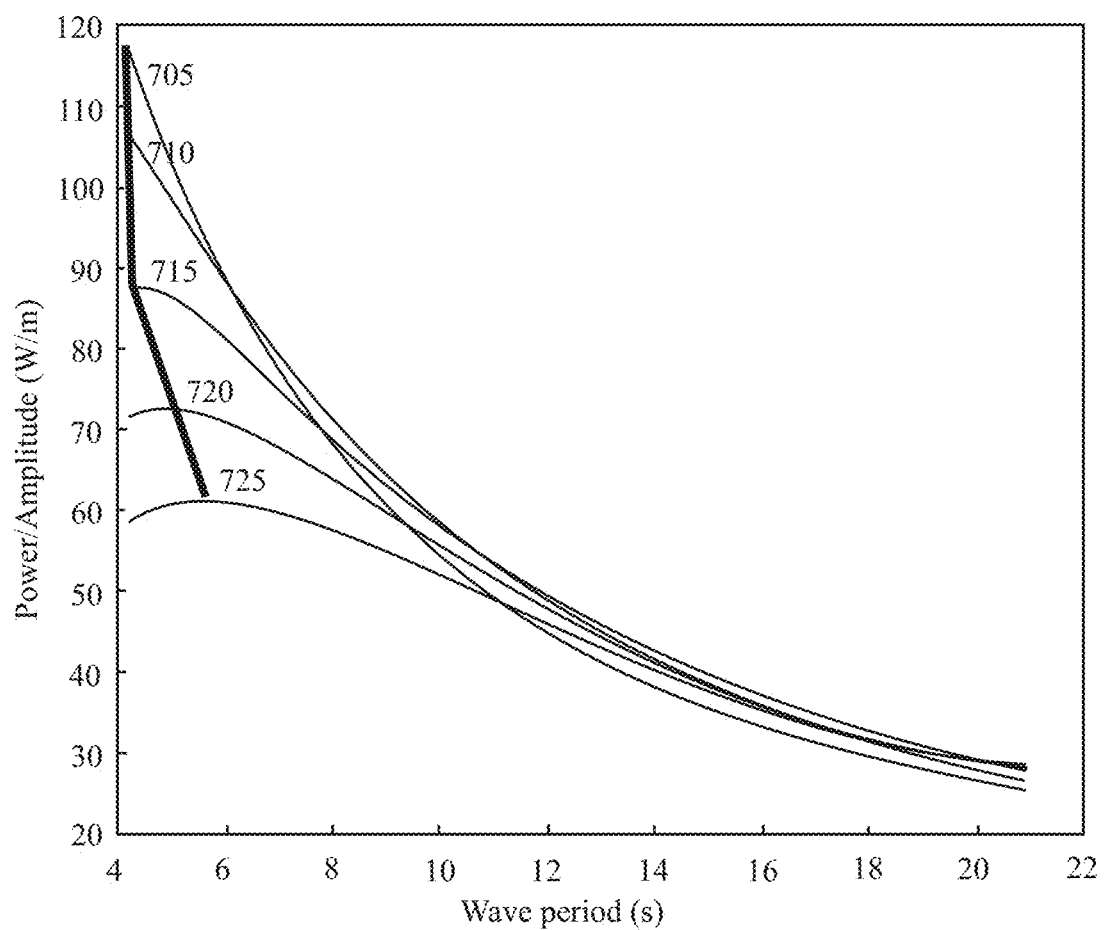
FIG. 7 illustrates the power output as a function of wave period (in seconds) for a wave energy pump having a chamber with a diameter of 1 m and a diaphragm with a spring stiffness ($K_c$) of 75 N/m as described by some embodiments herein.

FIG. 7 illustrates the power output as a function of wave amplitude (in meters) for a wave energy pump having a deformable chamber with a diameter of 1 m and a diaphragm with a spring stiffness ($K_c$) of 75 N/m as described by some embodiments herein. FIG. 7 shows the impact of various damping coefficients (line 705 shows a damping coefficient of 20 Ns/m, line 710 shows a damping coefficient of 40 Ns/m, line 715 shows a damping coefficient of 60 Ns/m, line 720 shows a damping coefficient of 80 Ns/m, and line 725 shows a damping coefficient of 100 Ns/m) on the power per wave amplitude for the wave energy pump. Note that a 2 m wave height is a typical or likely wave height in locations suitable for wave energy, which corresponds to a wave amplitude of 1 m. The wave energy pump may be similar or equivalent to the wave energy pump 100 of FIG. 1. For a wave energy pump with a deformable chamber with a diameter of 1 m (such as the deformable chamber 105 of wave energy pump 100 in FIG. 1), a smaller damping coefficient leads to a larger power output until a wave period of approximately 11 s. Note that typically, waves are considered to behave as a sinusoidal variation measured in change in the water surface elevation. A wave period is the time it takes for a wave to repeat (i.e., to return to its original starting point). The thick line in FIG. 7 shows the maximum power produced for each damping coefficient. As FIG. 7 demonstrates, for each damping coefficient, at a spring stiffness of 75 N/m and a deformable chamber diameter of 1 m, the greatest power produced is at lower wave periods (i.e., wave periods of less than 6 s) due to the natural frequency of the system.

Figure 8:
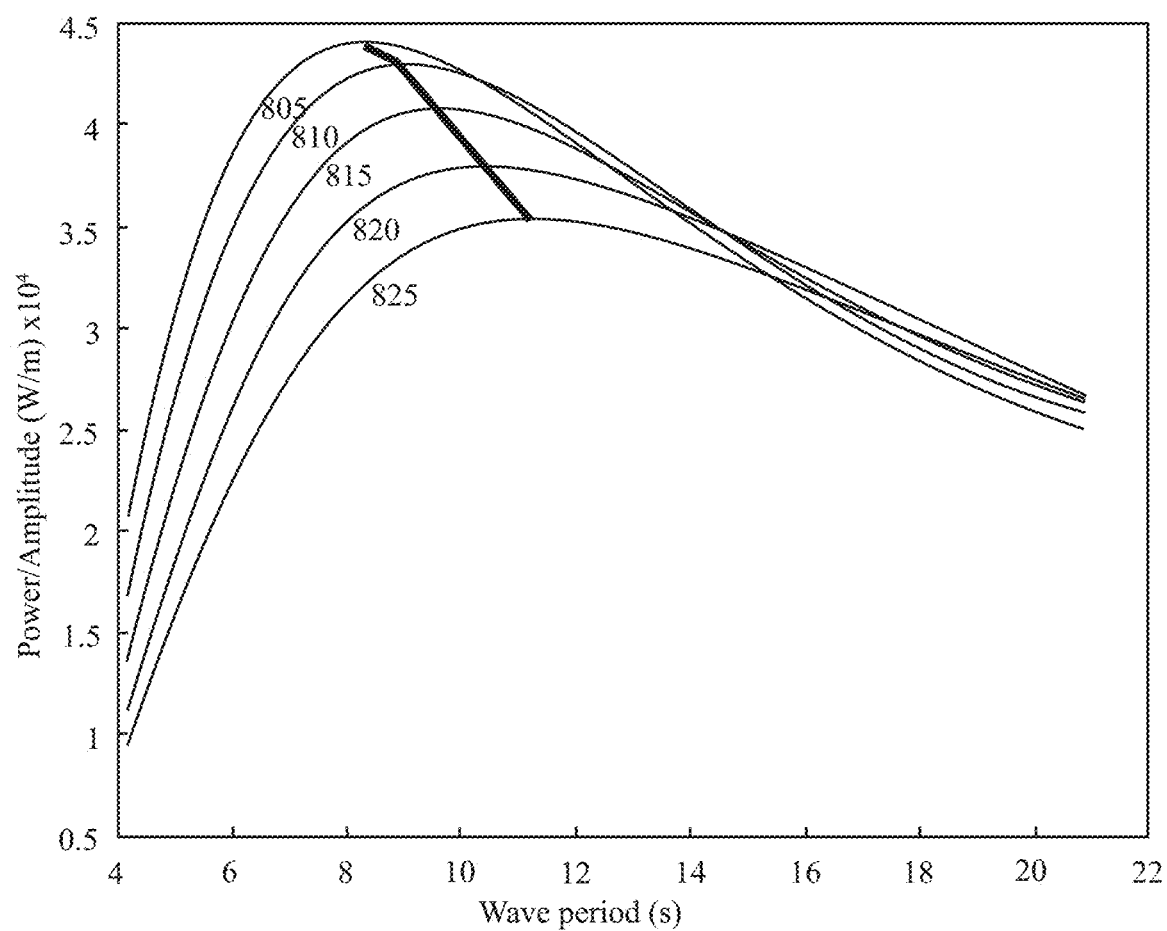
FIG. 8 illustrates the power output as a function of wave period (in seconds) for a wave energy pump having a chamber with a diameter of 10 m and a diaphragm with a spring stiffness ($K_c$) of 750 N/m as described by some embodiments herein.

FIG. 8 illustrates the power output as a function of wave amplitude (in meters) for a wave energy converter having a deformable chamber with a diameter of 10 m and a diaphragm with a spring stiffness ($K_c$) of 750 N/m as described by some embodiments herein. FIG. 8 shows the impact of various damping coefficients (line 805 shows a damping coefficient of 400 Ns/m, line 810 shows a damping coefficient of 600 Ns/m, line 815 shows a damping coefficient of 800 Ns/m, line 820 shows a damping coefficient of 1000 Ns/m, and line 825 shows a damping coefficient of 1200 Ns/m) on the change in power output for the wave energy pump. For a wave energy pump with a diameter of 10 m, a smaller damping coefficient leads to a larger power output, up to a wave period of approximately 14 s at which a smaller damping coefficient leads to a smaller power output. The thick line shows the maximum power produced by the wave energy pump at each damping coefficient. As shown in FIG. 7, the maximum power produced by a wave energy pump with a deformable chamber with a diameter of 10 m and a diaphragm with a spring stiffness of 750 N/m, occurs at wave periods between 8 and 12 s. Compared with the graph in FIG. 6, this indicates that increasing the diameter of the deformable chamber and/or increasing the spring stiffness of the diaphragm allows the wave energy pump to operate at maximum efficiency at larger wave periods.

Figure 9:
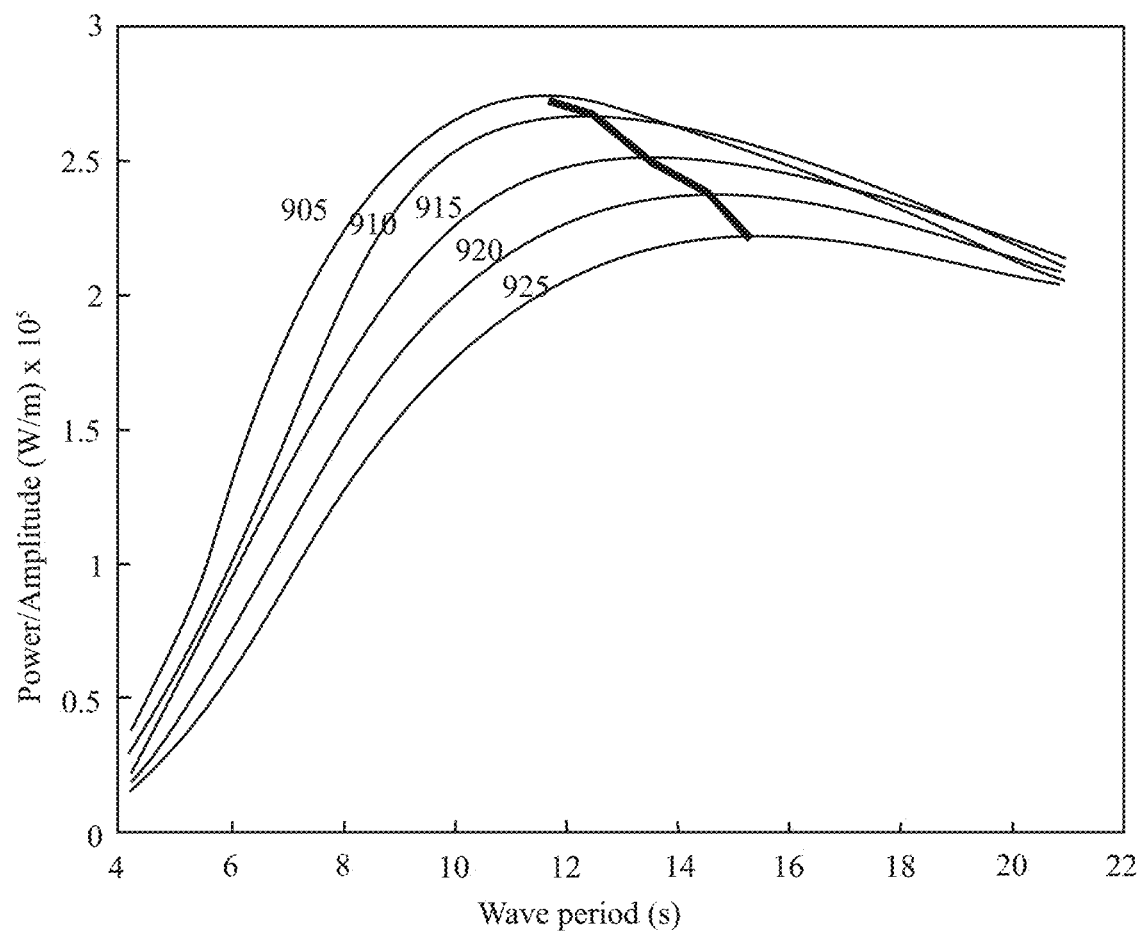
FIG. 9 illustrates the power output for a wave energy pump having a chamber with a diameter of 20 m as described by some embodiments herein and a diaphragm with a spring stiffness ($K_c$) of 1,400 N/m as a function of wave period (in seconds).

FIG. 9 illustrates the power output as a function of wave amplitude (in meters) for a wave energy pump having a diameter of 20 m and a diaphragm having a spring stiffness ($K_c$) of 1,400 N/m as described by some embodiments herein. FIG. 9 shows the impact of various damping coefficients (line 905 shows a damping coefficient of 1,000 Ns/m, line 910 shows a damping coefficient of 1,500 Ns/m, line 915 shows a damping coefficient of 2,000 Ns/m, line 920 shows a damping coefficient of 2,500 Ns/m, and line 925 shows a damping coefficient of 3,000 Ns/m) on the change in power output for a wave energy pump having an deformable chamber with a diameter of 20 m. As shown in FIG. 9, a smaller damping coefficient leads to a larger power output, up to a wave period of approximately 14 s, at which the smaller damping coefficient leads to smaller power output. The thick line in FIG. 9 shows the maximum power produced by a single wave energy pump with a deformable chamber with a diameter of 20 m at each damping coefficient. As shown in FIG. 9, the maximum power at this size of a deformable chamber for the given spring stiffness comes at a wave period between 11 and 15 s. As compared to FIGS. 7 and 8, the maximum power output increases as the diameter of the deformable chamber increases. The spring stiffness and damping may be used to tune the wave energy pump for optimal frequency. Note that FIGS. 7-9 show how spring stiffness and damping can be used to tune a wave energy pump to an optical frequency, resulting in a controlled hydraulic flow rate.

Figure 10:
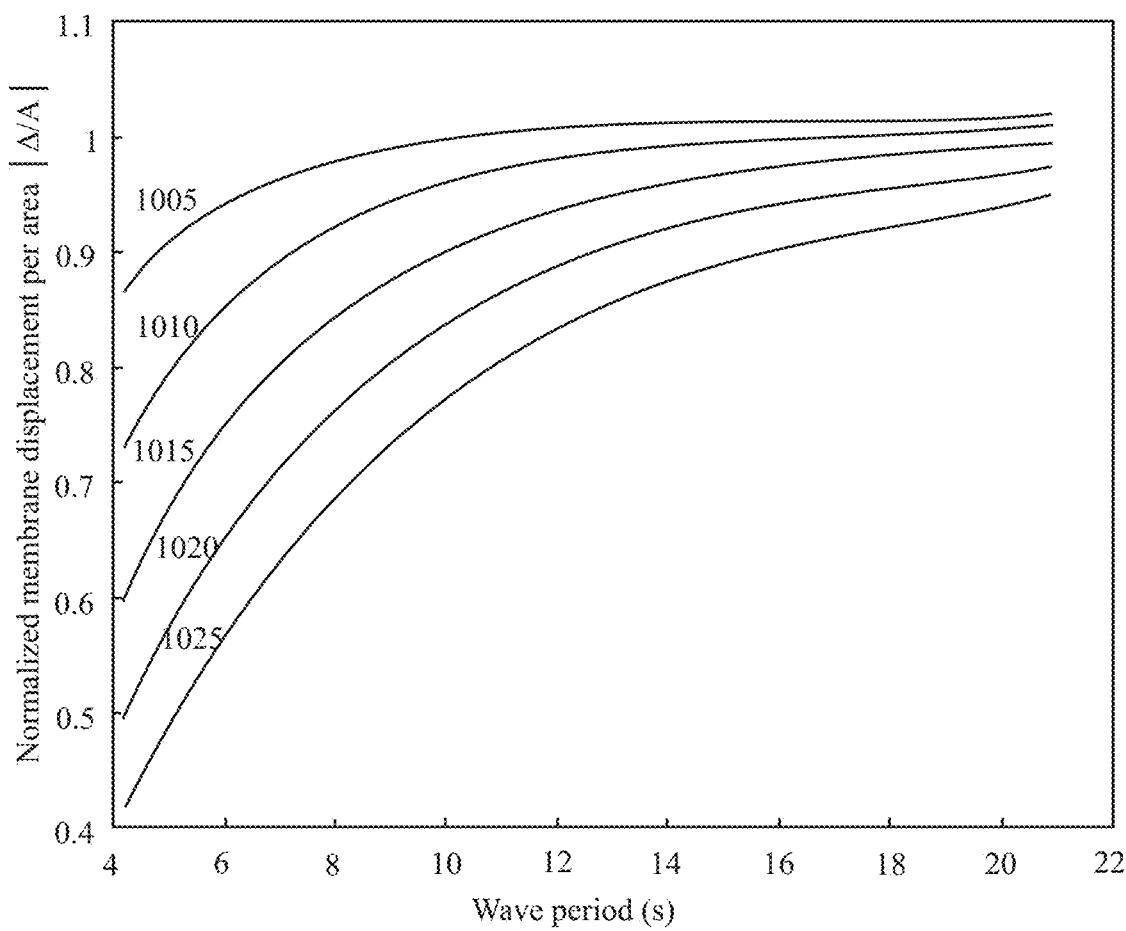
FIG. 10 illustrates the normalized diaphragm displacement as a function of wave period for a wave energy pump having a chamber with a diameter of 1 m herein and a diaphragm with a spring stiffness ($K_c$) of 75 N/m as described by some embodiments herein.

FIG. 10 illustrates the normalized membrane (or spring) displacement as a function of wave amplitude for a wave energy pump having a deformable chamber with a diameter of 1 m herein and a diaphragm with a spring stiffness ($K_c$) of 75 N/m as described by some embodiments herein. FIG. 10 shows the impact of various damping coefficients (line 1005 shows a damping coefficient of 20 Ns/m, line 1010 shows a damping coefficient of 40 Ns/m, line 1015 shows a damping coefficient of 60 Ns/m, line 1020 shows a damping coefficient of 80 Ns/m, and line 1025 shows a damping coefficient of 100 Ns/m) on the change in membrane displacement for a wave energy pump having an deformable chamber with a diameter of 1 m. As shown in FIG. 10, the greatest membrane displacement occurs with the lowest damping coefficient, regardless of the wave period. However, the benefit of the lesser damping coefficient decreases as the wave period increases. Combining the information gleaned from FIG. 7 with the information in FIG. 10, it can be determined that the greatest power may be generated using a diaphragm having a low damping coefficient, which results in the largest diaphragm displacement. To put another way, power is maximized by maximizing the displacement of the diaphragm, which can be done for a wave energy pump having an deformable chamber with a diameter of 1 m by using a low damping coefficient and in situations with a wave period of less than 11 s.

Figure 11:
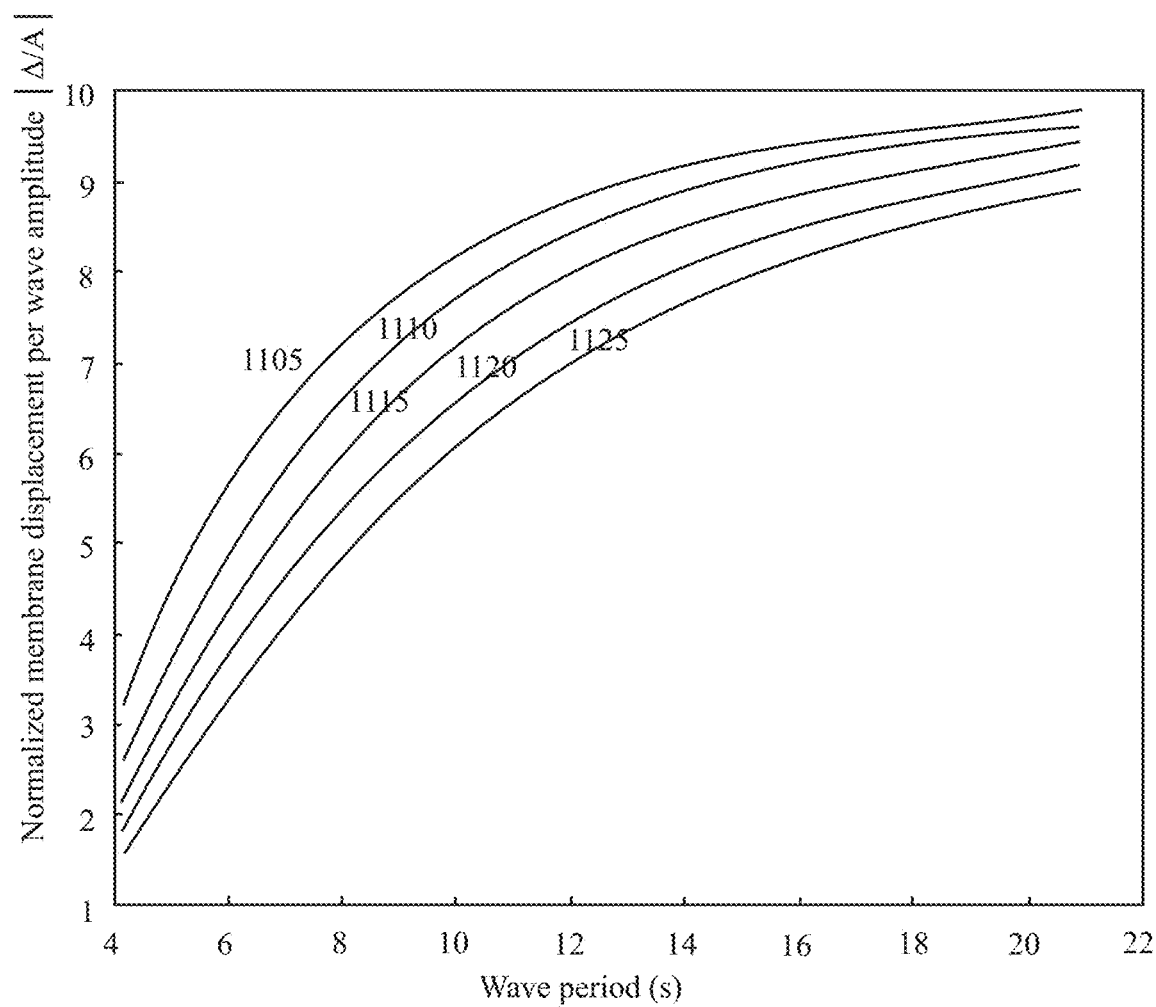
FIG. 11 illustrates the normalized diaphragm displacement as a function of wave period for a wave energy pump having a chamber with a diameter of 10 m and a diaphragm with a spring stiffness ($K_c$) of 750 N/m as described by some embodiments herein.

FIG. 11 illustrates the normalized membrane (or spring) displacement as a function of wave amplitude for a wave energy pump having a deformable chamber having a diameter of 10 m and a diaphragm having a spring stiffness ($K_c$) of 750 N/m as described by some embodiments herein. FIG. 11 shows the impact of various damping coefficients (line 1105 shows a damping coefficient of 400 Ns/m, line 1110 shows a damping coefficient of 600 Ns/m, line 1115 shows a damping coefficient of 800 Ns/m, line 1120 shows a damping coefficient of 1,000 Ns/m, and line 1125 shows a damping coefficient of 1,200 Ns/m) on the change in diaphragm displacement for the wave energy pump having a deformable chamber with a diameter of 10 m. The trend shown in FIG. 11 echoes the trend in FIG. 10, with the greatest diaphragm displacement occurring with the lowest damping coefficient, regardless of wave period. However, as in FIG. 10, the benefit of the lesser damping coefficient decreases as the wave period increases. Combining the information gleaned from FIG. 8 (also for a wave energy pump with a deformable chamber having a diameter of 10 m), it can be determined that larger diaphragm displacement results in greater power generation, and larger diaphragm displacement occurs at lower damping coefficients. The power is maximized for wave energy pumps with deformable chambers having a diameter of 10 m but maximizing the displacement of the diaphragm, which is done by using a low damping coefficient and occurring at a wave period below 14 s.

Figure 12:
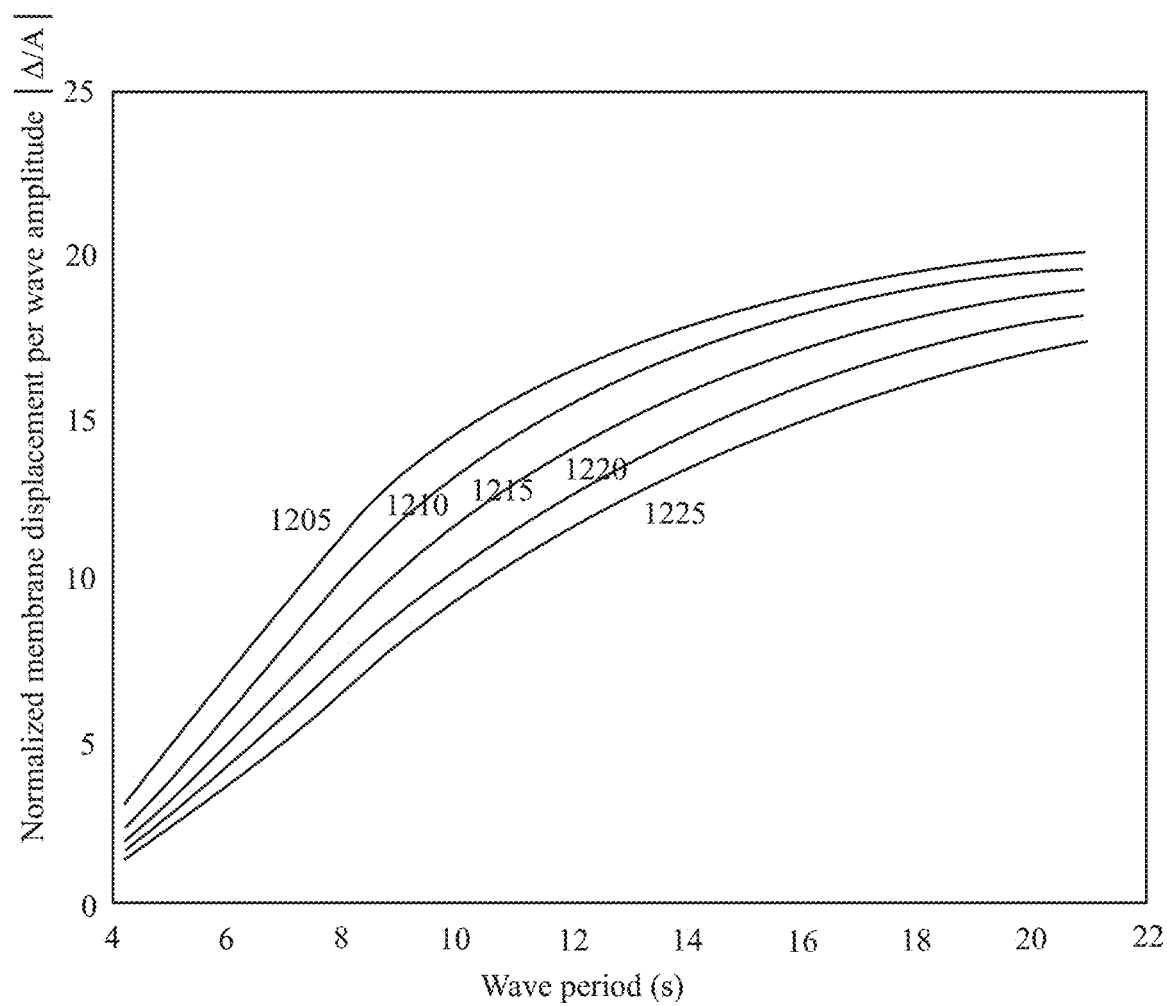
FIG. 12 illustrates the normalized a diaphragm displacement as a function of wave period for a wave energy pump having a chamber with a diameter of 20 m and a diaphragm with a spring stiffness ($K_c$) of 1,400 N/m as described by some embodiments herein.

FIG. 12 illustrates the normalized a membrane (or spring) displacement as a function of wave amplitude for a wave energy pump having a deformable chamber having a diameter of 20 m and a spring stiffness ($K_c$) of 1,400 N/m as described by some embodiments herein. FIG. 12 shows the impact of damping coefficients (line 1205 shows a damping coefficient of 1,000 Ns/m, line 1210 shows a damping coefficient of 1,500 Ns/m, line 1215 shows a damping coefficient of 2,000 Ns/m, line 1220 shows a damping coefficient of 2,500 Ns/m, and line 1225 shows a damping coefficient of 3,000 Ns/m) on the change in diaphragm displacement for the wave energy pump having a deformable chamber with a diameter of 20 m. The trend shown in FIG. 12 echoes the trends in FIGS. 10 and 11, with the greatest diaphragm displacement occurring with the lowest damping coefficient, regardless of wave amplitude. Combining the information gleaned from FIG. 12 with the information of FIG. 9 (also for a wave energy pump with a deformable chamber having a diameter of 20 m), it can be determined that larger diaphragm displacement results in greater power generation, and larger diaphragm displacement occurs at lower damping coefficients. The power is maximized for wave energy pumps having a diameter of 20 m but maximizing the displacement of the diaphragm, which is done by using a low damping coefficient and occurring at larger wave amplitudes. The tested range does not show when the diaphragm displacement begins to decline.

Figure 13:
FIG. 13 illustrates a prototype of a wave energy pump as described in some embodiments herein.

FIG. 13 illustrates a prototype of a wave energy pump as described in some embodiments herein. The wave energy pump 100 includes an inflatable chamber attached to a central column using two clamps, a diaphragm housing containing a diaphragm, and a mooring device. The wave energy pump 100 utilizes rubber for the inflatable chamber, polyvinyl chloride (PVC) pipe for the central column, and a metal hook as the mooring device.

In some embodiments, the wave energy pump may be transported to its deployment location either on land or by ship either in components or fully assembled. Due to the reduced weight and compact volume of the wave energy pump, multiple wave energy pumps may be transported and/or installed at once. In some embodiments, the wave energy pump as described herein may enable multiple devices to be deployed on a single low-cost vessel, reducing transportation cost. In some embodiments, the inherent load distribution and load shedding capabilities of the inflatable chamber may increase storm survivability. Unlike many rigid body devices, if the hydrodynamic or other loads acting on the body, exceed a threshold as expected during a storm condition, the forces can be dissipated through the utilization of pressure relief valves. These attributes are dramatically different than the traditional rigid body steel structures currently being utilized by the wave energy industry that must be designed to withstand the full load of storms.

The foregoing disclosure includes various examples set forth merely as illustration. The disclosed examples are not intended to be limiting. Modifications incorporating the spirit and substance of the described examples may occur to persons skilled in the art. These and other examples are within the scope of this disclosure and the following claims.

What is claimed is:

1. A device comprising:
    a first column having a first length, a first end, and a second end;
    a second column having a second length, a third end, and a fourth end connected to the first column such that the third end of the second column and the second end of the first column are in contact and the first column and the second column are approximately concentric;
    a chamber attached to the first end of the first column by a first clamp and attached to the second end of the first column by a second clamp;
    a first diaphragm located between the first column and the second column such that the first diaphragm separates the first column and the second column;
    an inlet valve located along the second length of the second column; and
    an outlet valve located along the second length of the second column; wherein:
    the chamber contains a first fluid,
    the second column contains a second fluid, and
    the first diaphragm separates the first fluid from the second fluid.

2. The device of claim 1, wherein the first column extends into the chamber and contains a opening into the chamber.

3. The device of claim 1, further comprising a mooring device, wherein:
    the mooring device is located along the second length of the second column; and
    the mooring device attaches the device to the sea floor.

4. The device of claim 1, wherein:
    the inlet valve is a one-way valve that allows the second fluid to flow into the second column; and
    the outlet valve is a one-way valve that allows the second fluid to flow out of the second column.

5. The device of claim 4, wherein:
    the first diaphragm has a neutral position;
    the first diaphragm is displaced from the neutral position by the first fluid when the chamber is compressed;
    when the first diaphragm is returned to the neutral position when the second fluid flows out of the outlet valve.

6. The device of claim 1, wherein the first fluid comprises a mixture of water and air.

7. The device of claim 1, wherein the second fluid comprises sea water.

8. The device of claim 1, further comprising:
    a second diaphragm, wherein:
    the first diaphragm and second diaphragm are operated in parallel.

9. The device of claim 1, wherein the first diaphragm is an elastomer diaphragm.

10. The device of claim 1, wherein the first diaphragm is a spring/roller diaphragm.

11. The device of claim 1, wherein the first diaphragm is a rubber diaphragm.

12. The device of claim 1, wherein the chamber comprises a flexible material.

13. A method comprising:
    attaching a wave energy pump to a solid object, the wave energy pump comprising:
    a first column having a first length, a first end, and a second end,
    a second column having a second length, a third end, and a fourth end,
    a chamber comprising a flexible material attached to the first end of the first column by a first clamp and attached to the second end of the first column by a second clamp, a diaphragm positioned between the second end of the first column and the third end of the second column, an inlet valve located along the second length, and an outlet valve located along the second length;

establishing a neutral state of the wave energy pump, wherein:

the diaphragm is at a neutral position, and a first fluid is contained within the chamber, and a second fluid is contained within the second column;

receiving a force to the wave energy pump, wherein:

the receiving of the force compresses the chamber, forcing the first fluid to contact the diaphragm, the diaphragm is displaced by the contacting of the first fluid, and the second fluid is pumped out of the second column through the outlet valve by the displacing of the diaphragm, and responding to a release of the force on the wave energy pump; wherein:

the responding releases the chamber, allowing the first fluid to enter the chamber, the diaphragm is returned to its neutral position, and the second fluid is pulled into the second column through the inlet valve by the returning of the diaphragm to its neutral position.

14. The method of claim 13, wherein: the diaphragm is a spring/roller diaphragm.

15. The method of claim 13, wherein:
the diaphragm is a rubber diaphragm.

16. The method of claim 13, wherein the diaphragm is an elastomer diaphragm.

* * * * *